US010841936B2

(12) United States Patent
Chapman et al.

(10) Patent No.: US 10,841,936 B2
(45) Date of Patent: Nov. 17, 2020

(54) UPSTREAM SPLIT SCHEDULER

(71) Applicant: Cisco Technology, Inc., San Jose, CA (US)

(72) Inventors: John T. Chapman, Orange, CA (US); Tong Liu, Acton, MA (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 16/257,485

(22) Filed: Jan. 25, 2019

(65) Prior Publication Data
US 2020/0245346 A1 Jul. 30, 2020

(51) Int. Cl.
*H04W 72/12* (2009.01)
*H04W 72/14* (2009.01)
(52) U.S. Cl.
CPC ... *H04W 72/1268* (2013.01); *H04W 72/1236* (2013.01); *H04W 72/1284* (2013.01); *H04W 72/14* (2013.01)

(58) Field of Classification Search
CPC ......... H04W 72/1268; H04W 72/1284; H04W 72/1236; H04W 72/14
See application file for complete search history.

(56) References Cited

U.S. PATENT DOCUMENTS

2011/0164586 A1* 7/2011 Kim ............... H04W 28/06 370/329
2017/0303273 A1* 10/2017 Jin ............... H04L 47/76
2018/0343206 A1* 11/2018 White ............... H04L 12/2801

* cited by examiner

*Primary Examiner* — Mohammad S Anwar
(74) *Attorney, Agent, or Firm* — Merchant & Gould P.C.

(57) ABSTRACT

A centralized Upstream (US) scheduling system configured to provide a US split scheduler may be provided. The centralized US scheduling system may comprise a US scheduler and a map editor. The US scheduler may be configured to create a map for US bandwidth allocation. The map may include Steady-State Grants (SGNTs) and Editable Grants (EGNTs). The map editor may be configured to receive the map from the US scheduler and to assign the EGNTs among low latency Service Flows (SFs).

20 Claims, 10 Drawing Sheets

UPSTREAM SPLIT SCHEDULER

TECHNICAL FIELD

The present disclosure relates generally to upstream scheduling.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
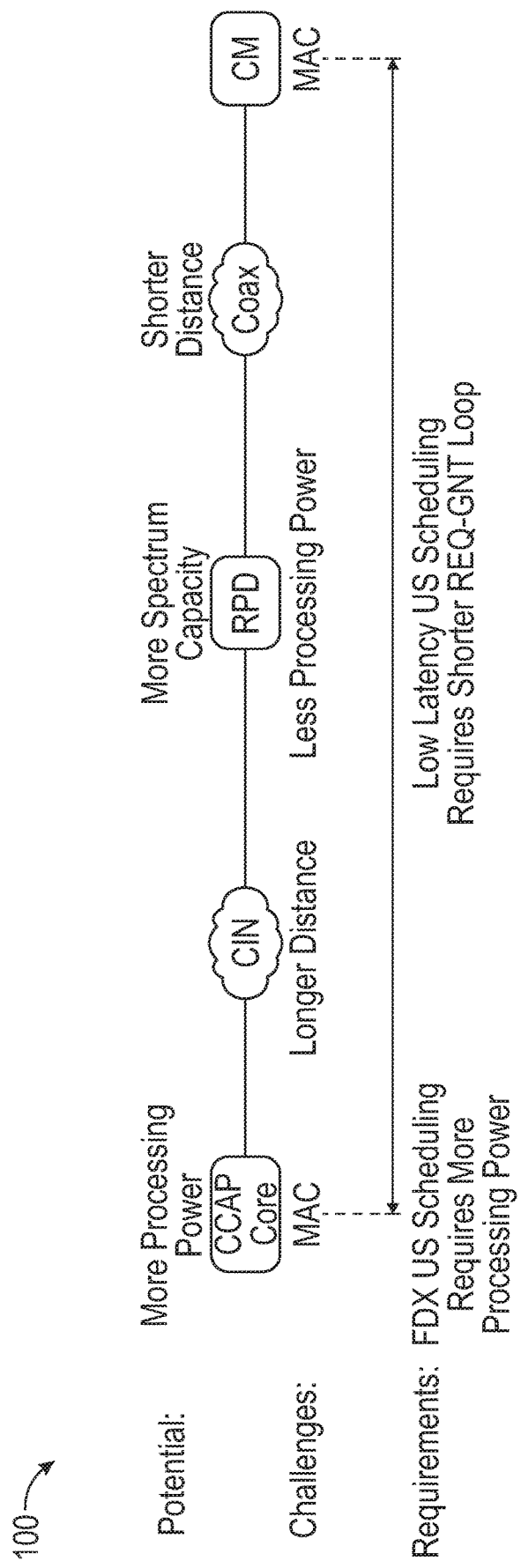
FIG. 1 illustrates a communications system.

A centralized Upstream (US) scheduling system configured to provide a US split scheduler may be provided. The centralized US scheduling system may comprise a US scheduler and a map editor. The US scheduler may be configured to create a map for US bandwidth allocation. The map may include Steady-State Grants (SGNTs) and Editable Grants (EGNTs). The map editor may be configured to receive the map from the US scheduler and to assign the EGNTs among low latency Service Flows (SFs).

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems. Fiber deep (FD) is a trend in which MSOs push fiber closer to customer premises equipment to provide users with better service. In order to facilitate FD, an optical HFC node comprising a Remote PHY Device (RPD) may be placed in the HFC network. As opposed to an amplifier, the RPD may receive signals from an MSO's headend via fiber optic cable rather than via coaxial cable for example. Accordingly, the optical HFC node comprising the RPD may be located at a junction of a fiber plant and a coaxial plant in the HFC network. In order to provide FD, many RPDs may be deployed in the HFC network.

A Cable Modem Termination System (CMTS) may provide high speed data services, such as cable Internet or Voice over Internet Protocol (VOIP) to users who may comprise MSO subscribers. Located in the MSO's headend, the CMTS may communicate with the RPD via fiber optic cable. The CMTS may be included in a Converged Cable Access Platform (CCAP) core. The CCAP core may control and setup data paths with multiple RPDs situated in multiple optical HFC nodes in the HFC network.

FIG. 1 illustrates a communications system 100. As shown in FIG. 1, Full Duplex (FDX) may significantly increase US bandwidth (i.e., 5 Gbps per service group), however it may also demand substantial CMTS processing power for scheduling the bandwidth. Cloud CMTS and fiber deep may centralize Data Over Cable Service Interface Specification (DOCSIS) MAC processing at the CCAP core, to alleviate power constraints at the RPD. Low latency DOCSIS US may require short MAC to MAC distance, making it desirable to put the US scheduling function at the RPD to avoid the request-grant (REQ-GNT) delay over a long distance Convergent Interconnected Network (CIN). Accordingly, there is a need to further reduce latency.

In order to solve this problem, embodiment of the disclosure may retain a centralized scheduler, but may add a mechanism at an edge that may help reduce latency. The edge device may react quickly by pushing down grants and then it may monitor what the central device does and when the central device takes over, it may back off. To accomplish this, the central device may own a map. The map may comprise a list of all of grants that may go to a cable modem. The central device may include Editable Grants (EGNTs) in the map. An RPD, which may comprise the edge device (e.g., map editor), may uses these EGNTs to reduce latency. A token bucket process down at the RPD may measure incoming requests and may measure the downstream grants and make a decision on when to insert or not.

Figure 2:
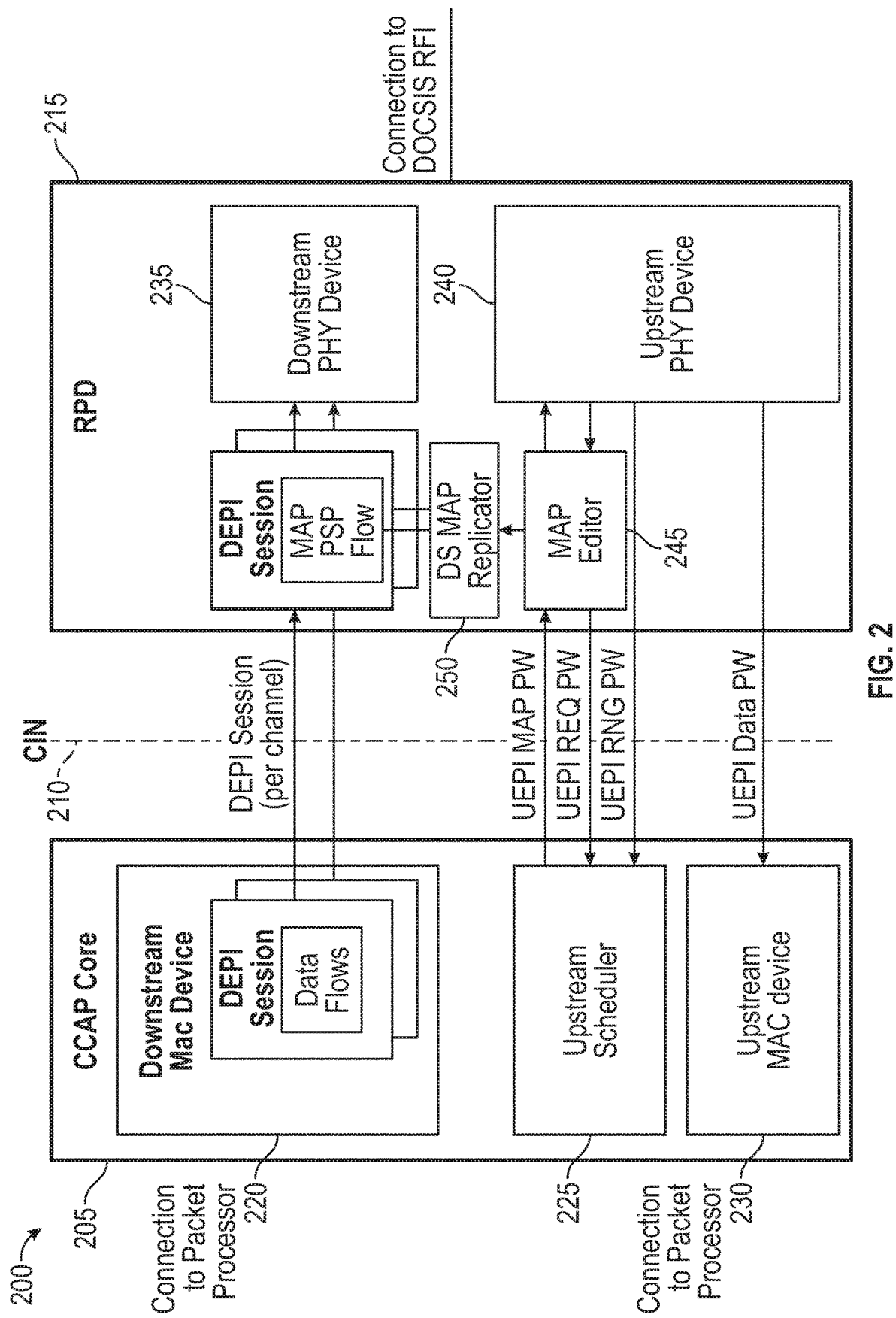
FIG. 2 is a block diagram of a centralized Upstream (US) scheduling system.

FIG. 2 is a block diagram of a centralized Upstream (US) scheduling system 200. As shown in FIG. 2, system 200 may comprise a core 205 (e.g., a CCAP core), a CIN 210, and an RPD 215. Core 205 may comprise a downstream MAC device 220, an upstream scheduler 225, and an upstream MAC device 230. RPD 215 may comprise a downstream PHY device 235, an upstream PHY device 240, a map editor 245, and a downstream map replicator 250.

Core 205 may enforce Service Level Agreements (SLAs) and may directly handle scheduling tasks that are delay insensitive. RPD 215 may ensure low latency with map editor 245 that may selectively add grants to flows. Maps may be sliced into sub millisecond MAPlets at RPD 215. Maps may be replicated and inserted into the downstream at RPD 215.

Elements of system 200 (e.g., core 205, RPD 215, downstream MAC device 220, upstream scheduler 225, upstream MAC device 230, downstream PHY device 235, upstream PHY device 240, map editor 245, and downstream map replicator 250) may be practiced in hardware and/or in software (including firmware, resident software, microcode, etc.) or in any other circuits or systems. The elements of system 200 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 200 may also be practiced using other technologies capable of performing logical operations such as, for example, AND, OR, and NOT, including but not limited to, mechanical, optical, fluidic, and quantum technologies. As described in greater detail below with respect to FIG. 12, the elements of system 200 may be practiced in a computing device 1200.

Embodiments of the disclosure may split DOCSIS US scheduling into core 205 US scheduler 225, which may create maps, and RPD 215 map editor 245 for latency reduction. US scheduler 225 may enforce Service Level Agreements (SLAs) and may directly handle scheduling tasks that may be delay insensitive, such as proactive granting. Map editor 245 may ensure low latency by adding grants to REQs to cover a bandwidth gap caused by a core REQ-GNT delay. Core 205 may control the remote granting by restricting the aggregated bandwidth (b/w) via specially reserved EGNTs. MAP editor 245 may assign a EGNT to a service flow (SF) by replacing a EGNT Service Identifier (SID) with a SF SID.

EGNTs may be used to cover a transient stage when a traffic rate is different from an assumed traffic rate at core 205 (e.g., at traffic starting time or when a traffic rate fluctuates). Once the traffic reaches a steady state, for example, regulated by the SLA, (e.g., maximum sustained rate), a granting pipeline may be established by core 205 US scheduler 225 via SF specific Steady-State Grants (SGNT). Map editor 245 may be located between a CIN interface and US PHY device 240, so that it may access Upstream External PHY Interface (UEPI) and DOCSIS External PHY Interface (DEPI) pseudowires (PWs) including, for example, UEPI MAP, UEPI REQ, and DEPI Data frames.

Map editor 245 may extract MAPs built by core 205 from the UEPI PW, and may slice them into sub-millisecond MAPlets, reducing a worst case REQ waiting time to sub-millisecond. Each MAPlet may be edited and transmitted separately with an advance time to cover, for example, a coax propagation delay and Cable Modem (CM) processing time, removing the CIN delay factor from the REQ-GNT latency. Upon detecting a REQ on a low-latency SF, and that there may be no SGNT in the next MAPlet, map editor 245 may grant the REQ with the available EGNTs.

To ensure SLA, fairness, and b/w efficiency, coordinated dual token bucket rate limiting may be used across core 205 and RPD 215 with core 205 as the controller. Map editor 245 may rate limit the REQs served by the EGNT to the difference between the maximum bytes allowed by the maximum sustain rate and the bytes served by the SGNTs. Core 205 may rate limit the REQs served by the SGNT to the difference between the maximum bytes allowed by the maximum sustain rate and the estimated bytes served by the projected SGNTs and EGNTs assigned by map editor 245 in the current core 205 REQ-GNT cycle and the following core 205 map interval.

Core 205 may implement an event driven map editor emulator that may run the same map editor scheduling process based on core maps built, the REQ received, and the projected REQs based on the steady state traffic model. To improve b/w efficiency, core 205 may schedule aggregated EGNTs for a group of SFs. Core 205 may use a statistical multiplexing model to provide probabilistic latency guarantees for the group of SFs. Core 205 may ensure EGNT sharing fairness and differentiation by provisioning the EGNT scheduling policies, controlling the SFs to EGNT stream mapping, and aggregated EGNT resource allocations.

To simplify map editing and improve CIN b/w efficiency, downstream map replication may be moved to map editor 245. Core 205 may use the UEPI MAP PW to convey the map content to map editor 245. Core 205 may setup the US to DS channel association for MAP replication via a control plane. Core 205 may pre-reserves downstream b/w to anticipate map insertion in downstream traffic scheduling. Map editor 245 may edit the UEPI map before passing it to US PHY device 240. Map editor 245 may generate downstream map replicas based on the edited UEPI MAP, and insert the downstream map replicas into the DEPI data sessions established for tge DS channels that are designated to carry the MAPs for the given US channel.

Figure 3:
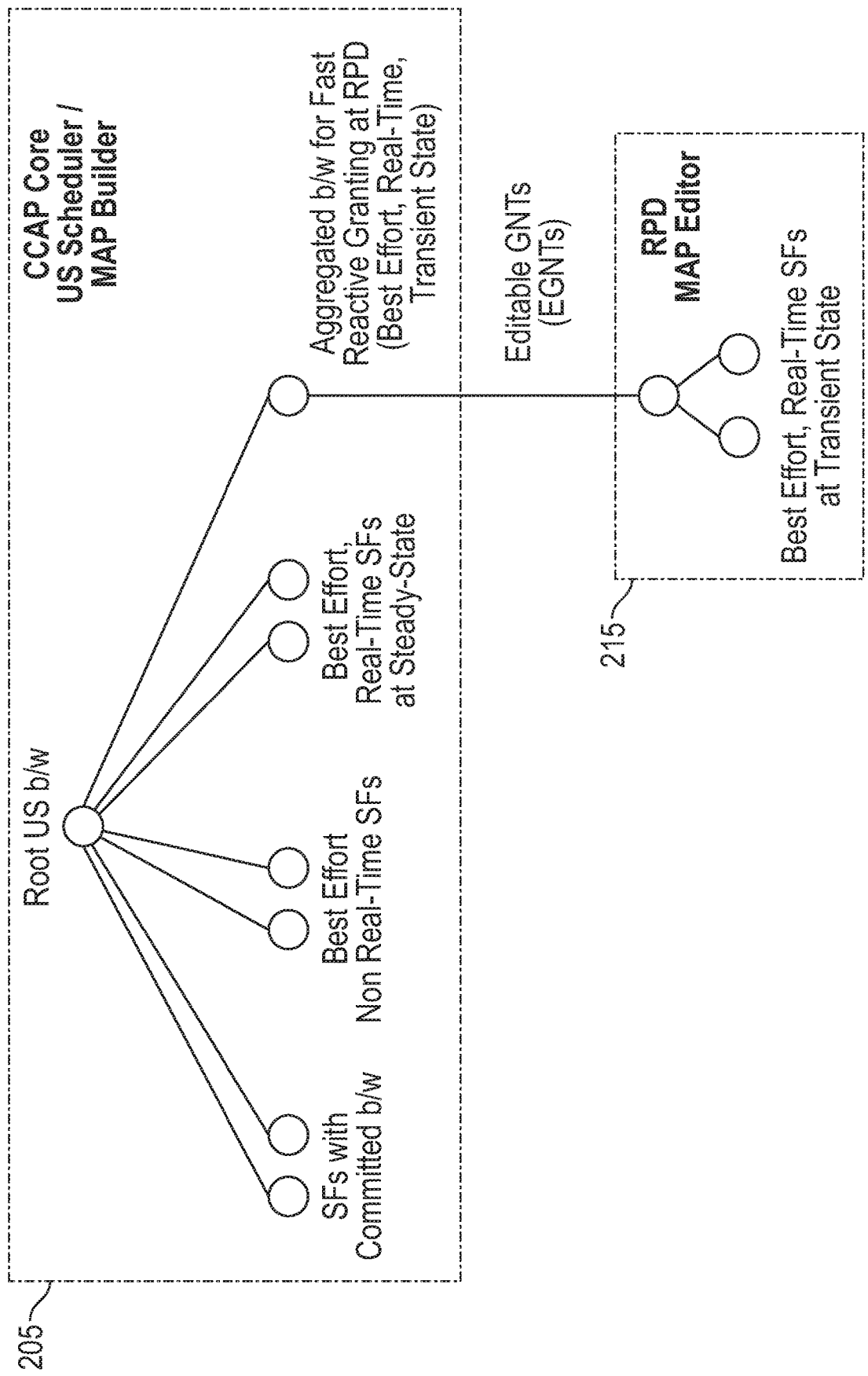
FIG. 3 illustrates an Upstream (US) scheduling hierarchy.

FIG. 3 illustrates a US scheduling hierarchy. As shown in FIG. 3, core 205 US scheduler 225 may build maps for b/w allocations that may be insensitive to REQ-GNT delay. This may include: i) proactive granting with committed b/w (i.e., provision based); ii) non-real time reactive granting; iii) SGNT for long lasting traffic flows; and EGNT allocation for map editor 245 to enable fast reactive granting. RPD 215 may distribute EGNTs among active low latency SFs. This may include: i) early granting upon random traffic activations; and ii) quick adaption to short term traffic variations.

Figure 4:
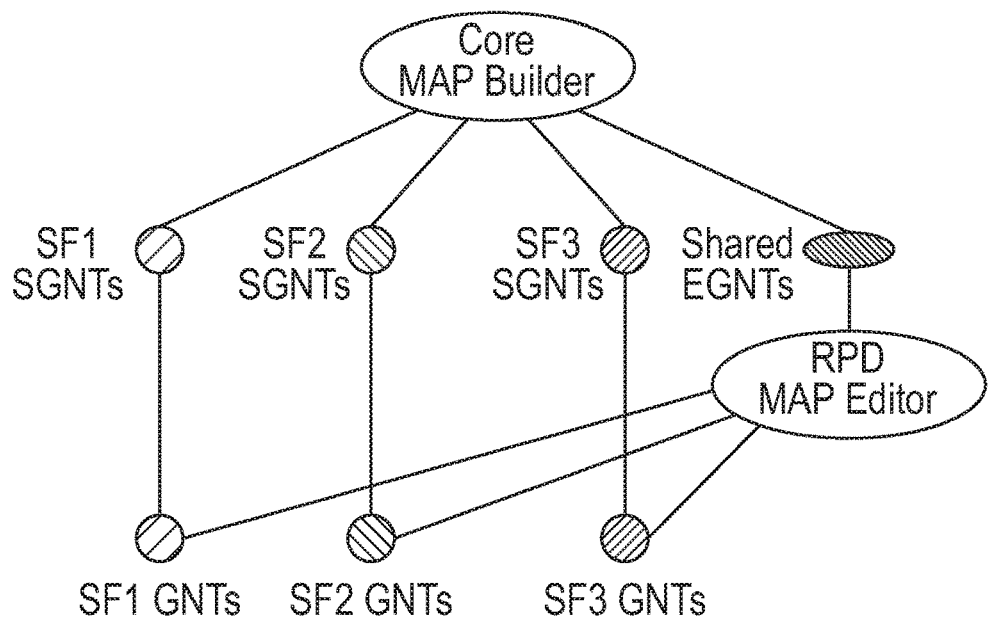
FIG. 4 illustrates map editing.

FIG. 4 illustrates map editing. As shown in FIG. 4, core 205 may build EGNTs, for example, an unspecific b/w resource that may be shared by a group of SFs. Core 205 may control an envelope of the shared resource based on aggregated Quality-of-Service (QoS) requirements. RPD 215 may assign an EGNT to a SF by editing the SID in the map IE carrying the EGNT. The assigned EGNTs, in addition to the SGNTs, may add to the total b/w assigned to the SF in order to fast react to b/w REQs whenever SNGTs may not be available.

Figure 5:
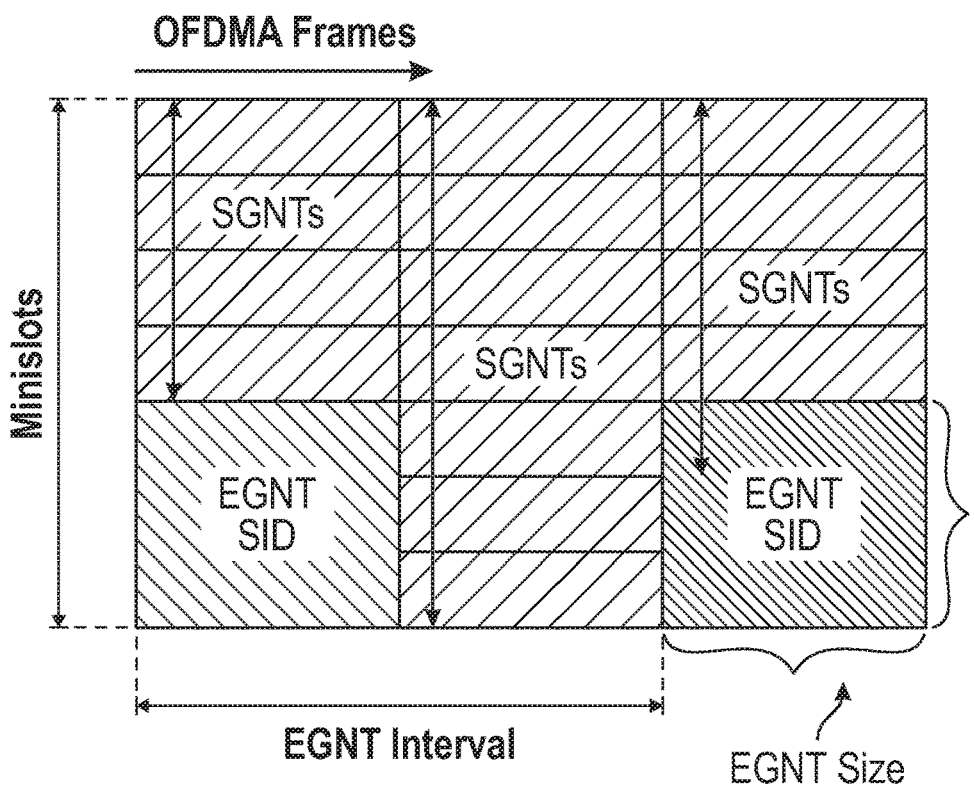
FIG. 5 illustrates Editable Grant (EGNT) representations in a map.

FIG. 5 illustrates EGNT representations in a map. As shown in FIG. 5, an EGNT may be identified by a designated SID uniquely assigned to RPD 215 for transient granting for a group of SFs. Core 205 may communicate the EGNT SID and SF to EGNT SID mappings to RPD 215 through the control plane. Core 205 may choose to differentiate low latency services with multiple EGNT streams, each EGNT stream may be mapped to a different group of SFs.

Figure 6:
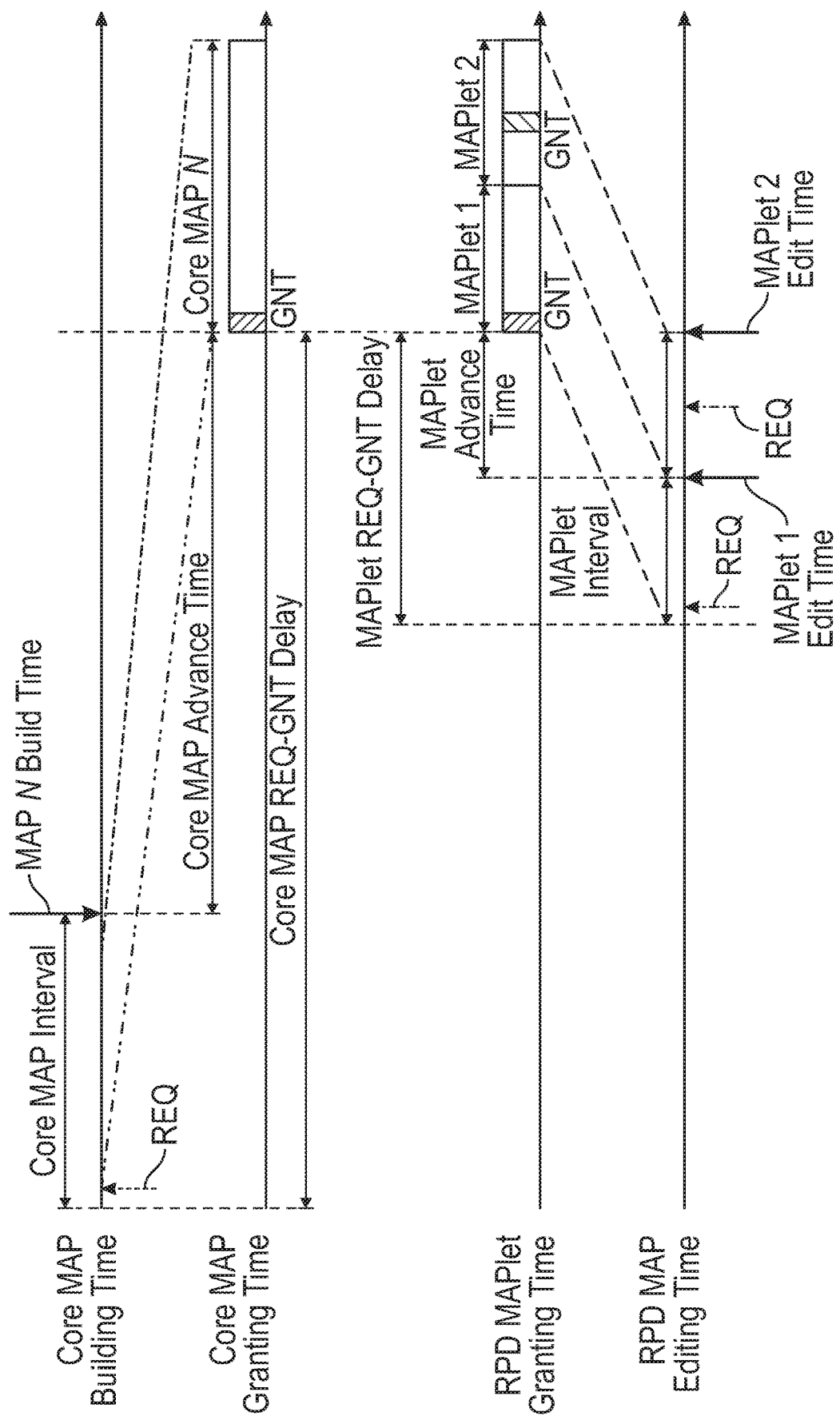
FIG. 6 illustrates MAPlet interval and advance time.

FIG. 6 illustrates MAPlet interval and advance time. As shown in FIG. 6, maps generated by map editor 245 may be in the format of small and frequent MAPlets to shorten the REQ-GNT delay. Map editor 245 may split a core map into multiple MAPlets, each containing a subset of the map IEs from the original map. Each MAPlet may be edited and transmitted at the MAPlet advance time. For example:

RPD MAPlet REQ-GNT delay=RDP MAPlet Interval+RPD MAP advance time RPD MAPlet REQ-GNT delay=1/$M$ (CoreMAP Interval)+ Core MAP advance time−CIN delay; where $M$ is the Core MAP Interval to MAPlet Interval ratio.

Figure 7:
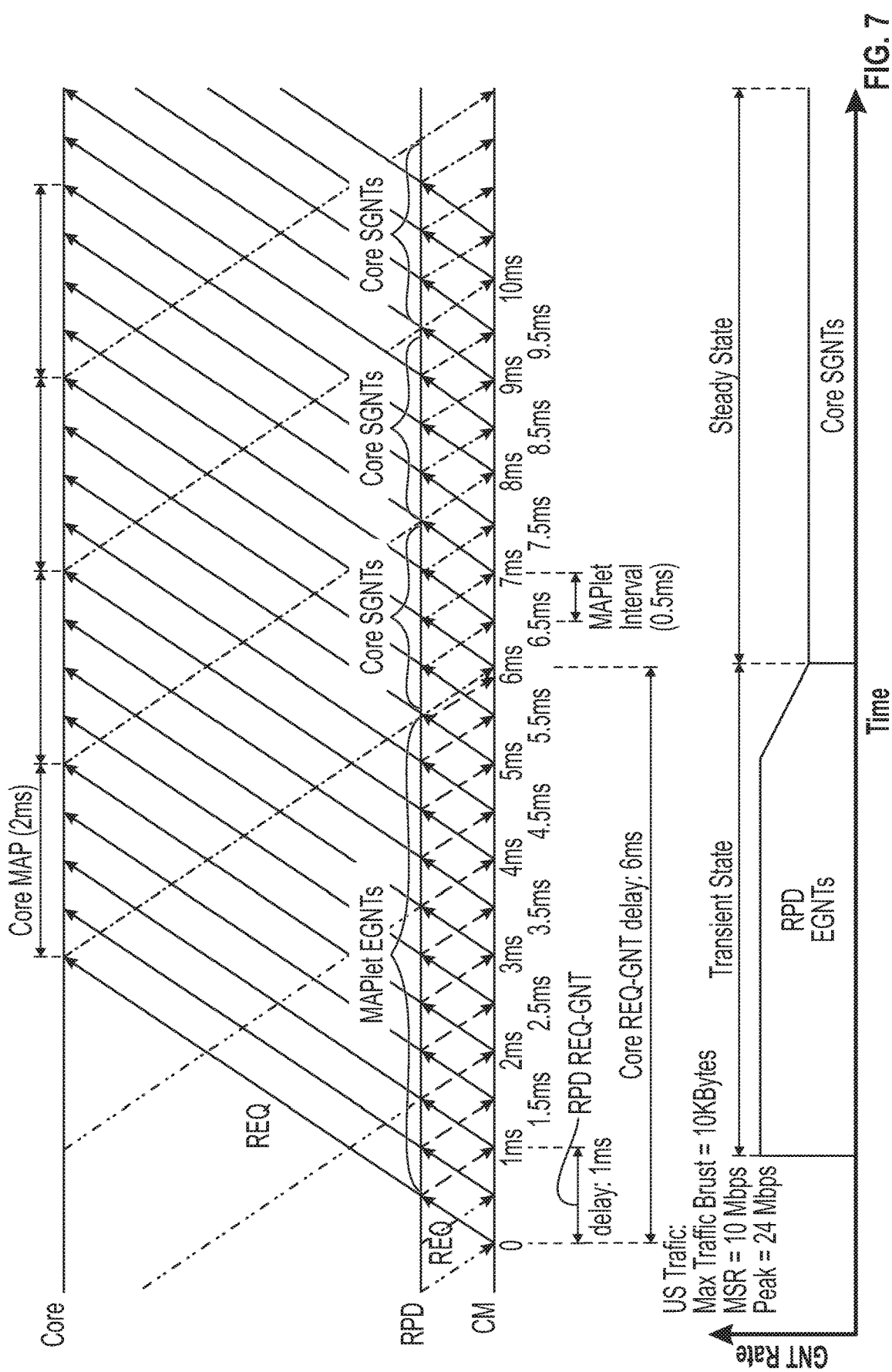
FIG. 7 illustrates Request (REQ)-Grant (GNT) coordination between a core and a Remote PHY Device (RPD)

FIG. 7 illustrates Request (REQ)-Grant (GNT) coordination between core 205 and RPD 215. As shown in FIG. 7, transient state granting may occur if REQ rate>GNT rate (e.g., at traffic starting time or when traffic rate fluctuates). Transient state granting may be handled by map editor 245, as it may be sensitive to REQ-GNT delay. Steady state granting may occur if REQ rate=GNT rate (e.g., when traffic may be steady and granting pipeline may be established. Steady state granting may be handled by US scheduler 225, as it may not be sensitive to REG-GNT delay.

Figure 8:
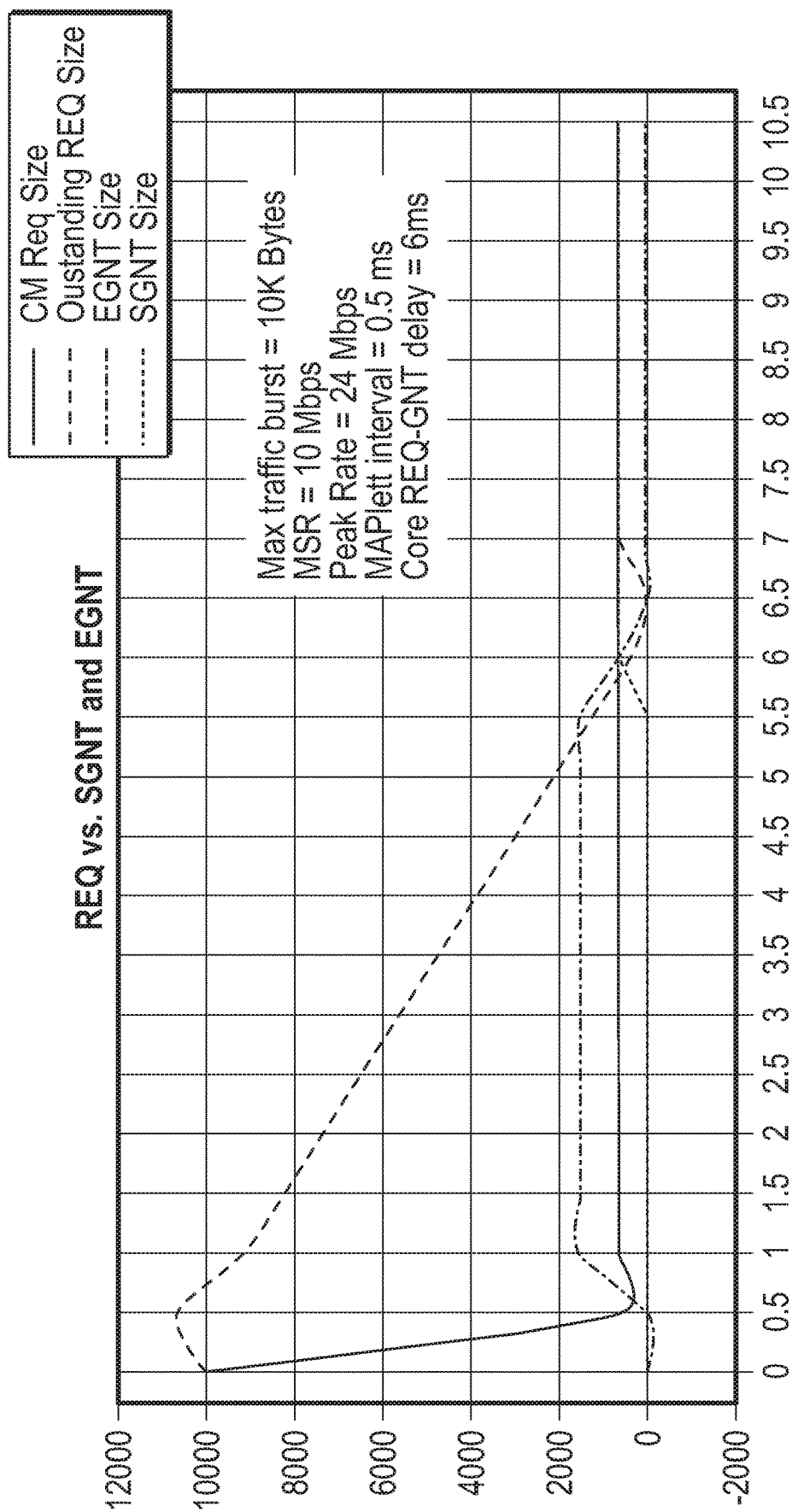
FIG. 8 illustrates Request (REQ)-Grant (GNT) coordination between a core and a Remote PHY Device (RPD)

FIG. 8 illustrates Request (REQ)-Grant (GNT) coordination between core 205 and RPD 215. As shown in FIG. 8, map editor 245 fast reacts to a REQ after an initial RPD REQ-GNT delay (e.g., 1 ms). Core SGNTs may be available after core REQ-GNT delay (e.g., 6 ms). The peak rate may impact initial burst latency. SGNTs and EGNTs may be tracked by both core 205 and RPD 215 to ensure the sum of SGNT and EGNT may match the rate limit. During any interval T, the max bytes forwarded may be:

$$Max(T)=S(T)+E(T); \text{ where}$$

Figure 9:
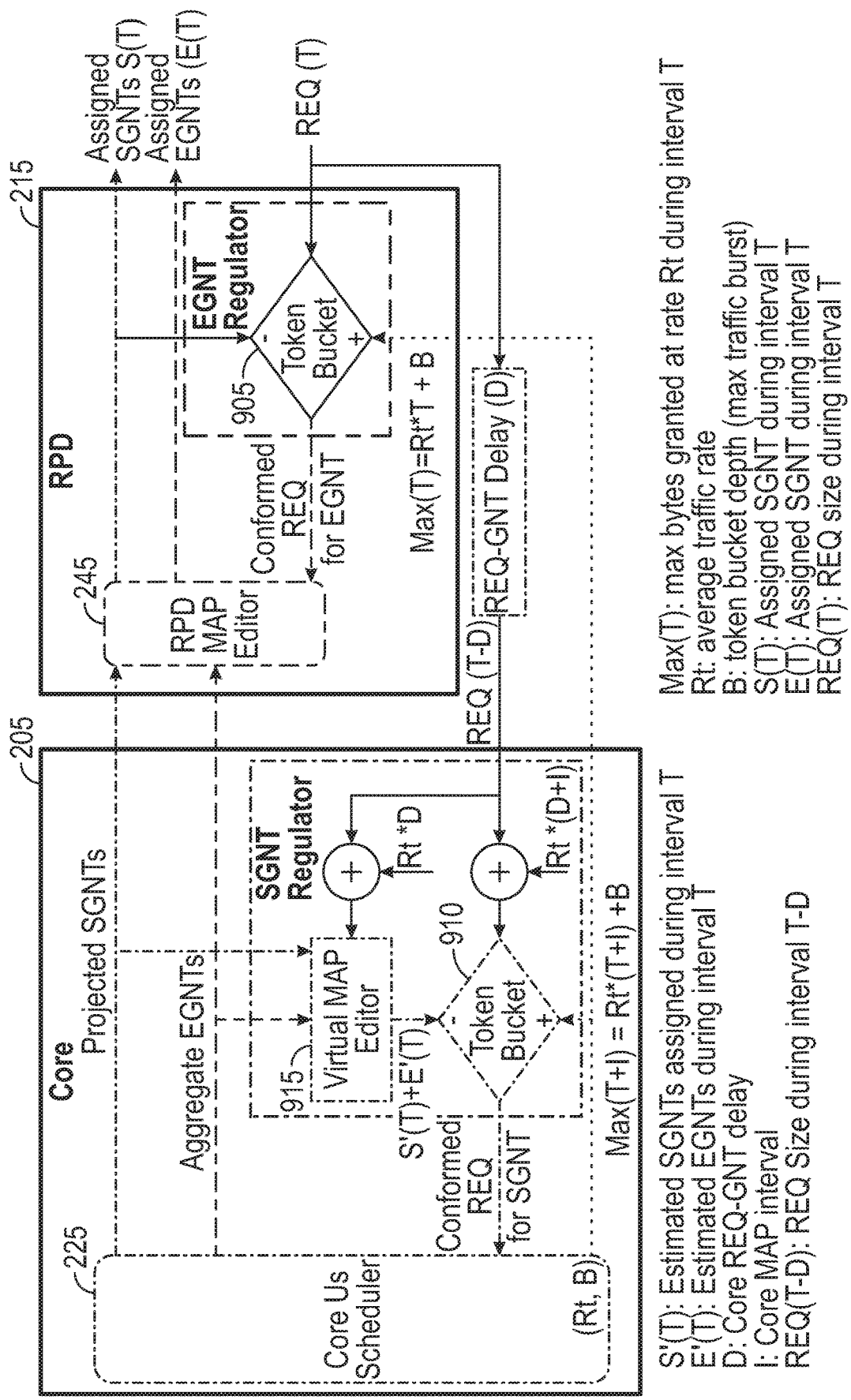
FIG. 9 illustrates Editable Grant (EGNT) and Steady-State Grant (SGNT) regulations.

Max(T)=Rt*T/8+B
Rt=target rate (e.g., max sustained rate)
B=max traffic burst
S(T)=SGNT size
E(T)=EGNT size FIG. 9 illustrates EGNT and SGNT regulations. As shown in FIG. 9, RPD 215 may regulate REQ size for potential EGNT sharing and compliment SGNTs with EGNTs. Core 205 may estimate EGNTs assigned for a received REQ and may project granting needs with SGNTs.

Regarding EGNT regulations, a per SF token bucket 905 may be used by map editor 245 to regulate the amount of REQs served by EGNTs.

$$Max(T)=T*Rt/8+B; \text{ where}$$

Max(T): the number of bytes forwarded is limited during any time interval T up to the DOCSIS time carried in the last REQ received at the RPD.
Rt: target rate for regulation, or token filling rate, and
B: token bucket depth, the max traffic burst in bytes.
The conformed REQ size for EGNTs, Re(T) may comprise:

$$REQe(T)=\min(Max(T)-S(T),REQ(T))$$

S(T): tokens consumed by SGNT during interval T
REQ(T): REQ size during interval T
REQe(T): REQ size conformed for EGNTs during interval T This equation may enforce that EGNTs may be only used when SGNTs cannot satisfy the regulated REQ size. US scheduler 225 may dynamically provision the Rt and B based on SLA overall traffic congestion level across all SFs sharing the aggregated EGNTs Regarding SGNT regulations, a per SF token bucket 910 may be used by US scheduler 225 to regulate the amount of REQ, including projected REQs that RPD 215 may receive during the CIN delay window and during the next granting cycle. The token filling rate (Rt) and bucket depth (B) may be the same as those used for EGNT regulation at map editor 245.

$$Max(T'+D+I)=(T'+D+I)*Rt/8+B;$$

where T' is any interval up to the DOCSIS time carried by the latest REQ received at core 205, D is the CIN delay, and I is the core grating cycle.

Core 205 may use a virtual map editor 915 to track the projected SGNTs and estimate EGNTs issued between the DOCSIS time of the latest REQ received and the DOCSIS time of the next SGNT (D). Virtual map editor 915 may use the same process as map editor 245 for applying SGNTs and EGNTs. Core 205 may estimate REQ size during the lagging interval D and the next core granting interval based on the steady state traffic model, Rt*(D+I).

Tokens may be consumed by the estimated SGNTs and EGNTs, S'(T) and E'(T). Steady state REQ estimation for the REQ-GNT interval (D) and the next granting cycle (I) may be added to the received REQ, REQ (T−D) for rate regulation, where the conformed REQ size for SGNTs in the next core granting interval is calculated as below:

$$REQs(T+I)=\min(Max(T+I)-S'(T)-E'(T),REQ(T-D)+Rt*(D+I))$$

Figure 10:
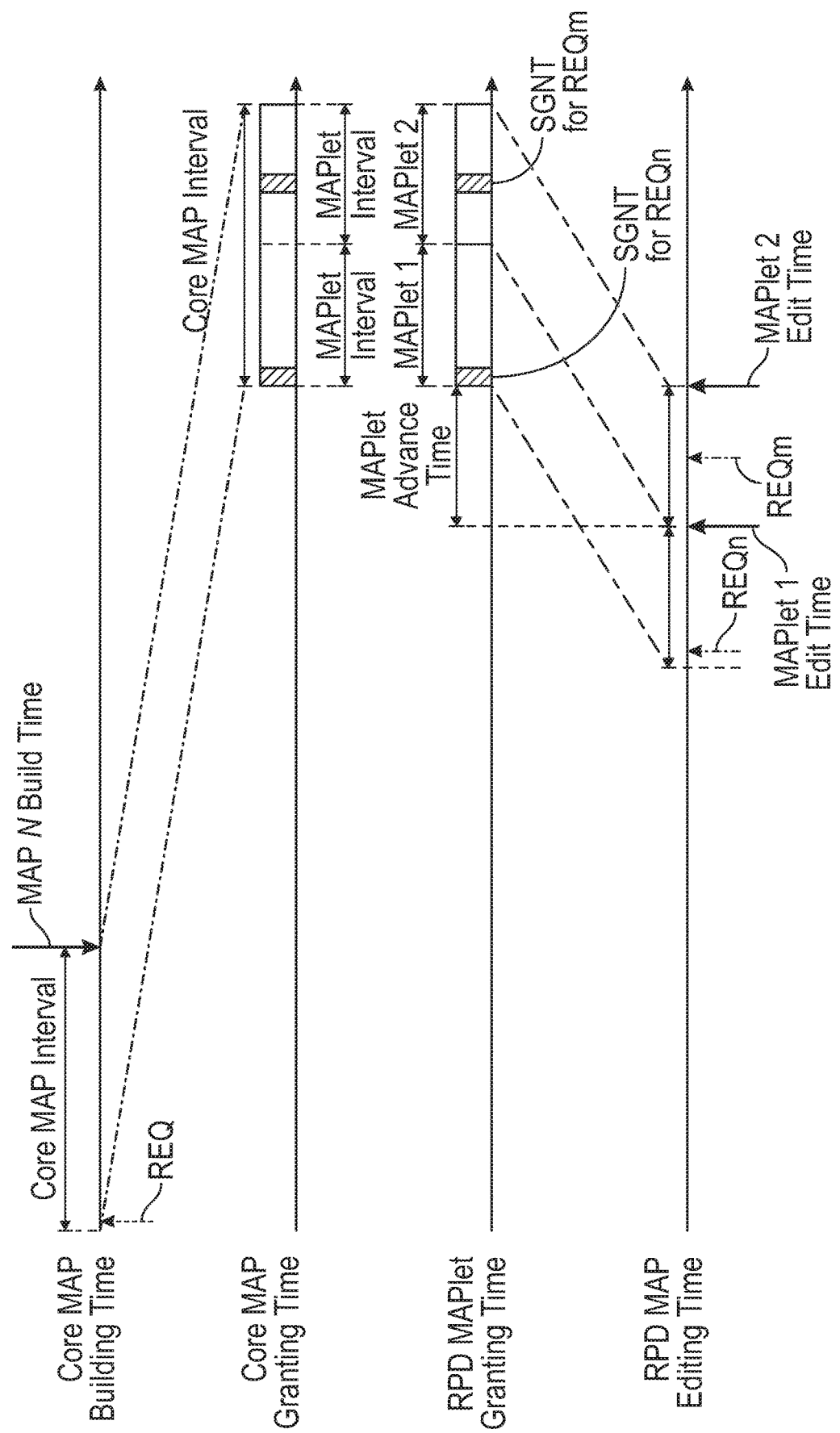
FIG. 10 illustrates Steady-State Grant (SGNT) scheduling at a core.

FIG. 10 illustrates SGNT scheduling at core 205. As shown in FIG. 10, SGNTs may comprise grants for future requests based on steady state traffic predictions. REQs may be handled every MAPlet interval at RPD 215, instead of the core map interval. To reduce SGNT prediction misses, core 205 may spaces the SGNTs based on the MAPlet interval.

To improve b/w efficiency, core 205 may schedule aggregated EGNTs for a group of SFs. Core 205 may use a statistical multiplexing model to provide probabilistic latency guarantees for the group of SFs:

$$P[AR<EG] \geq 1-\varepsilon$$

Where,
AR=aggregated REQs that require EGNTs at any time for all SFs in the EGNT sharing group
EG=total EGNT resource allocated by the Core for all SFs in the group
ε=probability of insufficient transient granting for any SF in the group
Multiplexing gain at the above probabilistic latency guarantees=maximum(ARγEG,
Where maximum(AR) is the worst case aggregated REQ rate for EGNTs when all SFs in the EGNT sharing group are active and experience maximum transient traffic.

Figure 11:
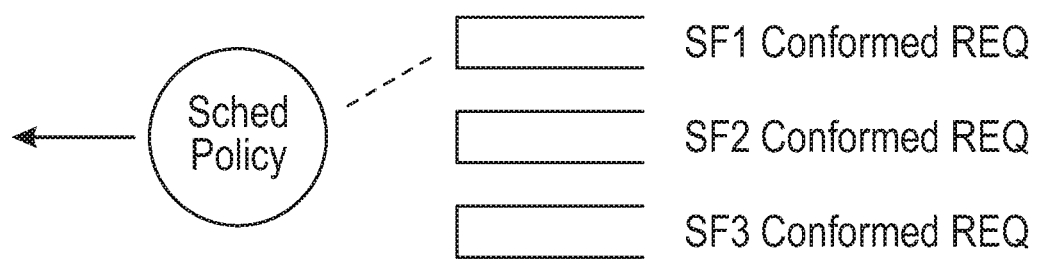
FIG. 11 illustrates Editable Grant (EGNT) scheduling policy at an RDP.

FIG. 11 illustrates EGNT scheduling policy at RDP 215. As shown in FIG. 11, scheduling policy options within the same service class, may comprise, but are not limited to, round robin and the earliest REQ time first. Scheduling policy options between different service classes may comprise, but are not limited to, strict priority and weighted round robin. Actual implementation, for example, may trade off QoS with simplicity.

Referring back to FIG. 2, map replication may be performed at RPD 215 by downstream map replicator 250. Per US channel MAP may need to be replicated into multiple copies, including: i) one copy for the US burst receiver via UEPI; and ii) one copy for each DS channel associated to the given US channel via DEPI. Multiple DS channels may be needed to carry maps for the same upstream channel.

To simplify map editing and improve CIN b/w efficiency, DS map replication may be moved to RPD 215 in the split-scheduler architecture. For example, core 205 may use the UEPI map to convey the map content to map editor 245, setup the US channel to primary DS channel mapping via the control plane, and pre-reserves DS b/w to anticipate map insertion in DS traffic scheduling. Map editor 245 may edit the UEPI map before passing it to US PHY device 240, may generate DS MAP replicas based on the edited UEPI map, and may insert the DS maps into the DEPI data session.

Figure 12:
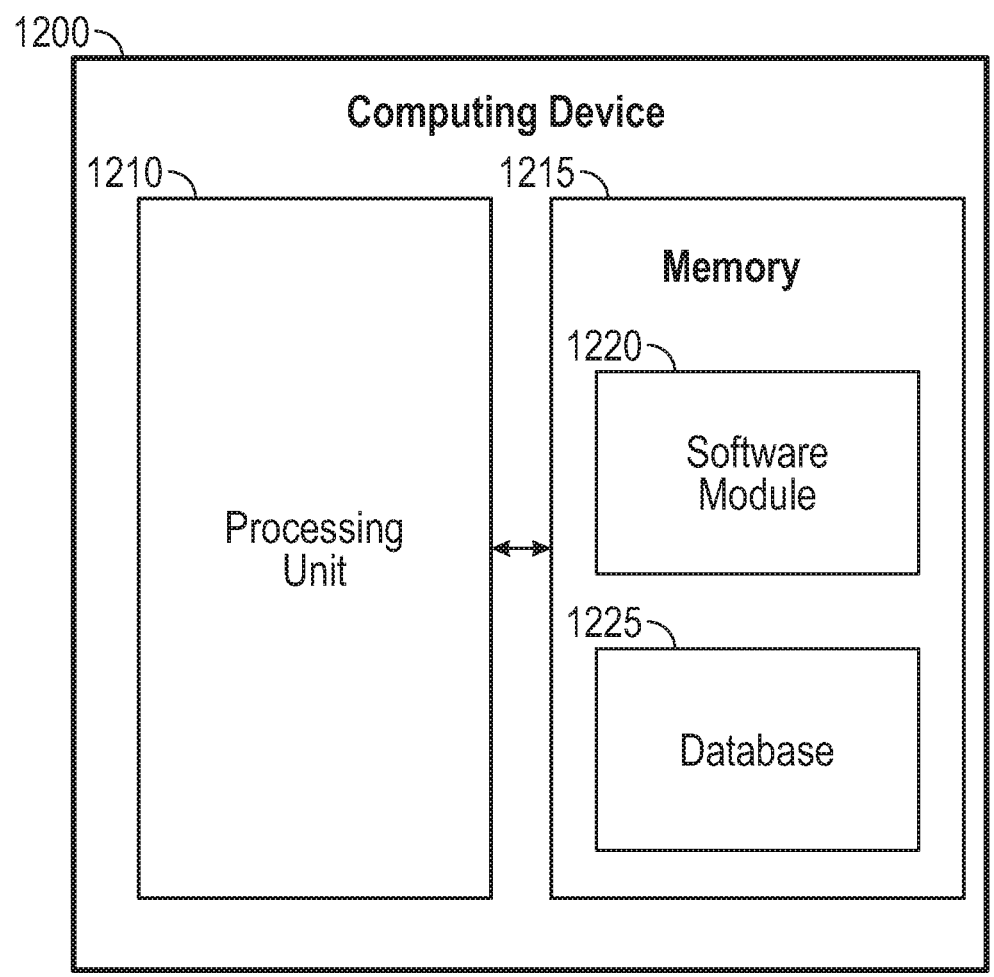
FIG. 12 is a block diagram of a computing device.

FIG. 12 shows computing device 1200. As shown in FIG. 12, computing device 1200 may include a processing unit 1210 and a memory unit 1215. Memory unit 1215 may include a software module 1220 and a database 1225. While executing on processing unit 1210, software module 1220 may perform, for example, processes for providing a US split scheduler described above. Computing device 1200, for example, may provide an operating environment for core 205, RPD 215, downstream MAC device 220, upstream scheduler 225, upstream MAC device 230, downstream PHY device 235, upstream PHY device 240, map editor 245, and downstream map replicator 250. Core 205, RPD 215, downstream MAC device 220, upstream scheduler 225, upstream MAC device 230, downstream PHY device 235, upstream PHY device 240, map editor 245, and downstream map replicator 250 may operate in other environments and are not limited to computing device 1200.

Computing device 1200 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 1200 may comprise any computer operating environment, such as hand-held devices, multiprocessor systems, microprocessor-based or programmable sender electronic devices, minicomputers, mainframe computers, and the like. Computing device 1200 may also be practiced in distributed computing environments where tasks are performed by remote processing devices. The aforementioned systems and devices are examples and computing device 1200 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 1200 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
an upstream (US) scheduler configured to create a map for US bandwidth allocation, the map including Steady-State Grants (SGNTs) and Editable Grants (EGNTs), wherein the US scheduler is disposed in a Convergent Cable Access Platform (CCAP) core; and
a map editor disposed in an Remote PHY Device (RPD), wherein the map editor is connected to the US scheduler through Upstream External PHY Interface (UEPI) pseudowires (PWs), and wherein the map editor is configured to;
receive the map from the US scheduler, and
assign the EGNTs among low latency Service Flows (SFs).

2. The system of claim 1, wherein the map editor being configured to assign the EGNTs among the low latency SFs comprises the map editor being configured to assign the EGNTs by replacing Service Flow Identifiers (SIDs) of the EGNTs with SIDs of the SFs to which they are assigned.

3. The system of claim 1, wherein the map editor being configured to assign the EGNTs among the low latency SFs comprises the map editor being configured to assign the EGNTs to cover a transient stage when an actual traffic rate is different from an assumed traffic rate at a core.

4. The system of claim 1, wherein the map editor being configured to assign the EGNTs among the low latency SFs comprises the map editor being configured to assign the EGNTs for early granting prior to a core establishing a granting pipeline.

5. The system of claim 1, wherein the map editor being configured to assign the EGNTs among the low latency SFs comprises the map editor being configured to assign the EGNTs for quick adaption to short-term traffic variations.

6. The system of claim 1, wherein the SGNTs are for long lasting traffic flows after a granting pipeline has been established by a core.

7. The system of claim 1, wherein the map editor is configured to access the UEPI PWS and DOCSIS External PHY Interface (DEPI) pseudowires (PWs).

8. The system of claim 1, wherein the map editor is further configured to slice the received map into sub-millisecond MAPlets to reduce a worst case request (REQ) waiting time to sub-millisecond.

9. The system of claim 1, wherein the map comprises a Data Over Cable Service Interface Specification (DOCSIS) MAP.

10. A method comprising:
creating, by an upstream (US) scheduler disposed in a Convergent Cable Access Platform (CCAP) core, a map for US bandwidth allocation, the map including Steady-State Grants (SGNTs) and Editable Grants (EGNTs);
receiving, by a map editor disposed in an Remote PHY Device (RPD), the map from the US scheduler), wherein the map editor is connected to the US scheduler through Upstream External PHY Interface (UEPI) pseudowires (PWs); and
assigning, by the map editor, the EGNTs among low latency Service Flows (SFs).

11. The method of claim 10, wherein assigning the EGNTs among the low latency SFs comprises assigning the EGNTs by replacing Service Flow Identifiers (SIDs) of the EGNTs with SIDs of the SFs to which they are assigned.

12. The method of claim 10, wherein assigning the EGNTs among the low latency SFs comprises assigning the EGNTs to cover a transient stage when an actual traffic rate is different from an assumed traffic rate at a core.

13. The method of claim 10, wherein assigning the EGNTs among the low latency SFs comprises assigning the EGNTs for early granting prior to a core establishing a granting pipeline.

14. The method of claim 10, wherein assigning the EGNTs among the low latency SFs comprises assigning the EGNTs for quick adaption to short-term traffic variations.

15. The method of claim 10, further comprising slicing the received map into sub-millisecond MAPlets to reduce a worst case request (REQ) waiting time to sub-millisecond.

16. A system comprising:
a Convergent Cable Access Platform (CCAP) core comprising an upstream (US) scheduler, wherein the US scheduler is configured to create a map for US bandwidth allocation, the map including Steady-State Grants (SGNTs) and Editable Grants (EGNTs);
a Remote PHY Device (RPD) comprising a map editor, wherein the map editor is configured to;
receive the map from the US scheduler, and
assign the EGNTs among low latency Service Flows (SFs); and
Upstream External PHY Interface (UEPI) pseudowires (PWs) connecting the US scheduler to the map editor.

17. The system of claim 16, wherein the map editor being configured to assign the EGNTs among the low latency SFs comprises the map editor being configured to assign the EGNTs by replacing Service Flow Identifiers (SIDs) of the EGNTs with SIDs of the SFs to which they are assigned.

18. The system of claim 16, wherein the map editor is further configured to slice the received map into sub-millisecond MAPlets to reduce a worst case request (REQ) waiting time to sub-millisecond.

19. The system of claim 16, wherein the map editor being configured to assign the EGNTs among the low latency SFs comprises the map editor being configured to assign the EGNTs to cover a transient stage when an actual traffic rate is different from an assumed traffic rate at the CCAP core.

20. The system of claim 16, wherein the map editor being configured to assign the EGNTs among the low latency SFs comprises the map editor being configured to assign the EGNTs for early granting prior to the CCAP core establishing a granting pipeline.

* * * * *